April 24, 1945.  A. K. BRUMBAUGH  2,374,410
EARTH MOVING EQUIPMENT
Filed Dec. 14, 1942  4 Sheets-Sheet 1

INVENTOR.
ANDREW K. BRUMBAUGH.
BY
Chas. E. Townsend
ATTORNEY.

INVENTOR,
ANDREW K. BRUMBAUGH.
BY
Chas. E. Townsend
ATTORNEY

April 24, 1945.  A. K. BRUMBAUGH  2,374,410
EARTH MOVING EQUIPMENT
Filed Dec. 14, 1942  4 Sheets-Sheet 3
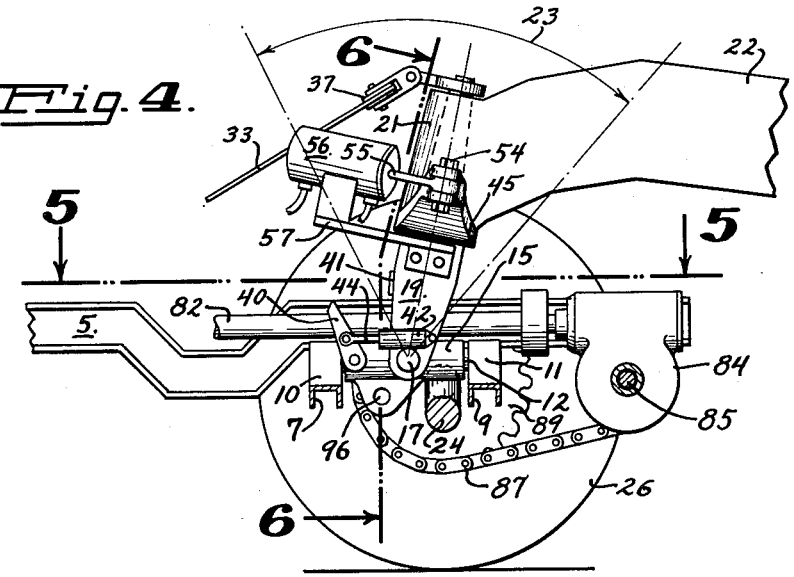
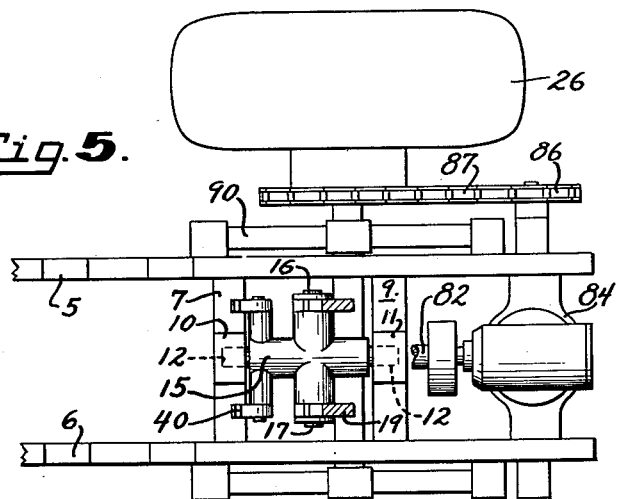
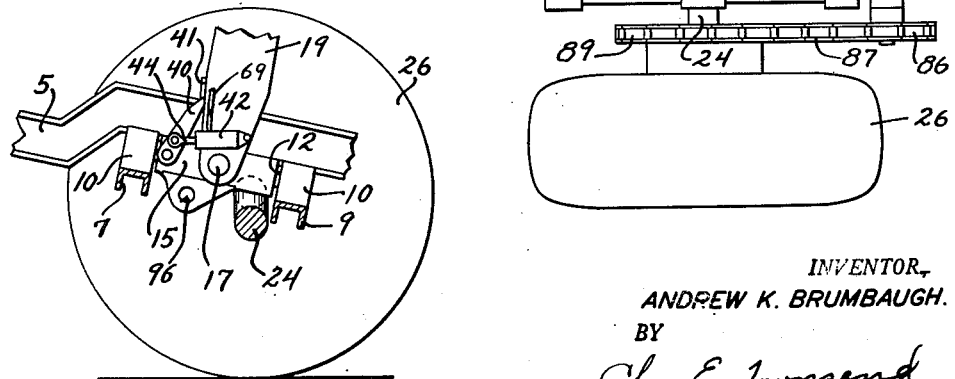
INVENTOR,
ANDREW K. BRUMBAUGH.
BY
Chas. E. Townsend
ATTORNEY.

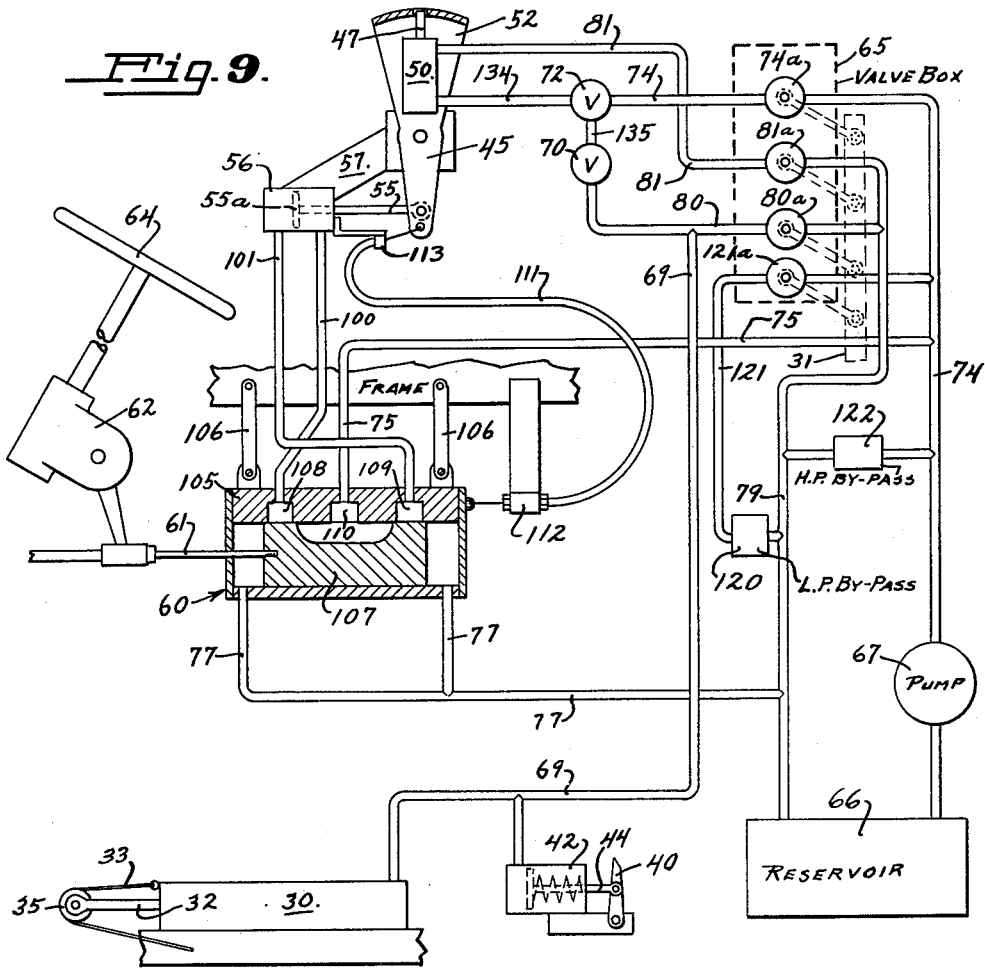

Patented Apr. 24, 1945

2,374,410

UNITED STATES PATENT OFFICE 2,374,410

EARTH-MOVING EQUIPMENT

Andrew K. Brumbaugh, Palo Alto, Calif., assignor to Knuckey Truck Company, San Francisco, Calif., a copartnership consisting of William A. Knuckey and Andrew K. Brumbaugh Application December 14, 1942, Serial No. 468,947

28 Claims. (Cl. 37—124)

My invention relates to earth moving equipment, and particularly to a combination tractor and trailer device as well as to a combination scraper and hauling device.

The present application is a continuation in part of my co-pending application Serial Number 410,146, filed September 9, 1941, for "Earth moving equipment," and since abandoned.

Recent developments in highway construction, dams, levees, and other large-scale earth-moving operations, have made increased demands on the abilities of the tractor units which draw self-loading "carryalls" or scrapers. These devices were originally designed to be drawn by tractors of the continuous tread or "caterpillar" type, which can exert a high tractive effort. This high tractive effort is necessary in the loading or cutting operation, since all the power used in making the cut derives therefrom. The conventional endless tread tractor can exert the required force, but is limited to a maximum speed of eight to ten miles per hour. While this speed is adequate where the haul is short, it is definitely uneconomical in large scale operations, where the haul may be from one thousand feet to several miles.

Under these conditions, hauling speeds of twenty-five miles per hour or more are necessary. In order to insure satisfactory control at this high speed, more effective steering and braking facilities must be provided than are available in the endless tread types of tractors. A vehicle satisfactory for a long haul at high speed should have the characteristics both of a high speed truck and a tractor. While it is being operated to cut and load, it should maintain a stable, regular relation between the road wheels and the cutting edge, so that the cut will be at any depth desired by the operator. It must also maintain a desired line of direction under his control and exert all the tractive effort of which the tractor is capable, at cutting speed, without undue slippage or abrupt changes of direction.

The current practice in using scrapers drawn by endless tread vehicles is to provide additional tractive effort during cutting by the use of a "stinger," or second tractor acting against the rear of the scraper. This additional force, applied at the scraper rear, has the tendency, with scrapers of the known designs, to make the entire combination weave from side to side and up and down. This causes the bottom of the cut to be irregular or "washboardy," and makes control of the direction in which the scraper and its propelling vehicle move extremely difficult, since the relation between the tractor and the scraper has previously been essentially unstable, and is accentuated in its irregularities by the helping units. In my device, additional tractive force is secured by transferring substantially all of the weight of the tractor on to the driving wheels and steering through the rear wheels.

In the other phase of operation, that is, while hauling the load at high speed, the vehicle should operate in the same manner as does a combination tractor and trailer unit. The controls should be so arranged that the driver can manipulate his vehicle with the same ease and certainty of control as he would a conventional type of automobile. There is widespread familiarity with the operation of the conventional automotive vehicles, and it is desirable to take advantage of this fact. By arranging the controls of my earth-moving vehicle in a fashion corresponding to that in which they are found in ordinary automobiles, the habits of skill may be transferred from one to the other, and it is not necessary that the operator should go through a long and expensive training process before he can use the equipment efficiently.

An important object of my invention is to provide a combination scraper and hauling device which has a coordinated steering system, whereby horizontal, angular relationship of the parts is maintained even though the combination is shifted from cutting to hauling position while making a turn. This is important as no violent stress forces are set up in the mechanism which would otherwise be the result if the tractor in hauling position was to start out in a different angle or curve than that experienced while the combination was working in cutting position. Another important object of the invention is to provide a combination tractor and trailer, in which the tractive effort may be increased whenever this appears to be desirable. Another important object of the invention is to provide means for turning the steering wheels of a vehicle by supplying a force which reacts on the steering wheels as well as on the non-steering wheels, with the non-steering wheels anchored so that the steering wheels must turn. Other objects of the invention will become apparent on reading this specification.

When used for high speed hauling, the vehicle must have brakes adequate to deal with the greater forces involved at high speeds. It should also be capable of use over irregular ground, have a short turning radius, and should be easily maneuverable.

These control functions should be exercised by well-known standard types of mechanisms, which should operate in exactly the same way, whether cutting or transporting the load, and should operate sequentially automatically as far as possible. Further, the tractor should be of the same type as that used in other trucking operations, so that the maintenance problems may be simplified.

A number of additional advantages will be apparent to those skilled in the art from the description following.

My invention consists, in brief, in the combination of a tractor equipped with improved control mechanisms, operating in a simpler and more conventional manner, to which may be attached any form of trailer or scraper now in general use. This power unit, or tractor, is similar in arrangement of its parts to the conventional truck-tractor. It consists of a frame mounted through springs on a front steering axle and a solid or a dead rear axle. Brakes and means for applying them may be installed at the wheels of each axle. A steering gear, with the usual front axle connections and steering wheel, controls the direction when operating on the road. The usual clutch and brake foot levers and transmission control levers are in their conventional relation to the driver's seat and to the steering wheel.

The internal combustion engine, with cooling, fuel, and electrical accessories, occupies the forward position in the frame and the clutch, transmissions, and other driving mechanisms are connected by shafts in the conventional fashion. The rear wheels are driven by chains from a jackshaft which is placed to the rear of the rear dead axle. This unorthodox position of the jackshaft provides improved service and operating functions and makes possible a desirable shortness of wheel base with space for the special mechanism which connects the tractor and the scraper.

The novel connecting mechanism provides means for accomplishing the functions desired. It consists of a universal joint in the form of a "Cardan cross" or universal joint which is attached to the tractor frame ahead of and slightly above the dead rear axle. The cross lies in a horizontal plane and the shaft, extending vertically upward from one of the yokes of the cross, provides a pivot upon which rotates a rigid gooseneck attached to the scraper. This construction brings the line of the tractive resistance force of the scraper approximately at the center line of the rear dead axle which gives very satisfactory conditions for traction as a conventional tractor-trailer.

When the equipment has been brought into position where cutting and loading is to start, the front wheels of the tractor are raised from the ground by a hydraulic cylinder. All of the weight of the tractor, plus some counterbalancing weight of the scraper, is then on the drive wheels of the tractor. The combined vehicle then operates as a four-wheel unit with power applied at the front wheels, i. e., tractive wheels of the tractor.

During the cutting operation, with the tractor wheels raised, steering is effected by swivelling the tractor wheels under the front end of the scraper yoke in the same way as the front wheels of an ordinary wagon are turned. To control this motion I introduce a steering plate which is rotatable freely around a vertical axis on the bottom portion of the scraper neck. The rotation of this plate, with reference to the universal joint yoke, is controlled by a double-acting hydraulic cylinder which is attached to an arm on the universal joint yoke, with its piston rod connected to an arm on the steering plate. Through a device linked to the steering gear, oil or other pressure medium is admitted to the ends of the steering cylinder to rotate the steering plate in synchronism with the front steering wheels of the tractor. This rotatable steering plate has no steering function while the tractor front wheels are on the ground but rotates in conformity with the swivelling of the front steering wheels.

A steering plate lock is placed in working position by a hydraulic cylinder and is retracted and made inoperative when the hydraulic pressure is released. The lock pin is carried on an arm of the scraper neck and, in working position, fits into a recess in the steering plate and, in effect, makes the steering plate a part of the scraper neck. Under this condition the horizontal angular relation of the tractor driving axle to the fore and aft centerline of the scraper is varied by the movement of the driver's steering wheel.

The hoisting latch is mounted on the Cardan cross and, meeting lugs on the universal joint yoke, limits the amount of lift when the front wheels are raised. It is held out of contact by a spring when running over the road, but is moved automatically to a locked position when the front wheels are lifted. The hydraulic pressure interlocks, and valving for the various functions is obtained from standard commercial products.

Briefly, the sequence of hydraulic operation is as follows: A valve is opened which puts pressure on the steering plate lock cylinder. When this lock seats, oil or other pressure medium is automatically admitted to the hoisting latch cylinder. When this latch is in place the hoisting cylinder comes in to raise the tractor front from the ground.

The details of the embodiment generally described above are illustrated in the accompanying drawings, in which:

Fig. 4 is a schematic side view, partially in section, of my invention, taken as indicated by line 4—4 of Fig. 3.

Fig. 5 is a top view, in section, of details of my invention, taken as indicated by line 5—5 of Fig. 4.

Fig. 7 is a fragmentary detail view of the locking mechanism of my invention.

Fig. 9 is a diagrammatic view of the operating elements of my invention.

Figure 1:
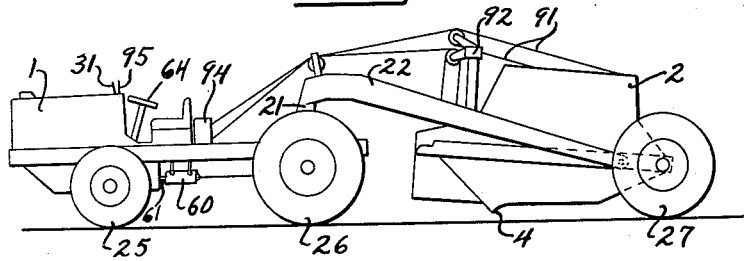
Fig. 1 is a schematic side view of a scraper incorporating my invention in traveling position.

Referring now to the drawings for a more detailed understanding of my invention, I have shown schematically in Fig. 1 a four-wheel propelling unit 1, to which is attached a scraper body 2 raised into load-carrying position.

Figure 2:
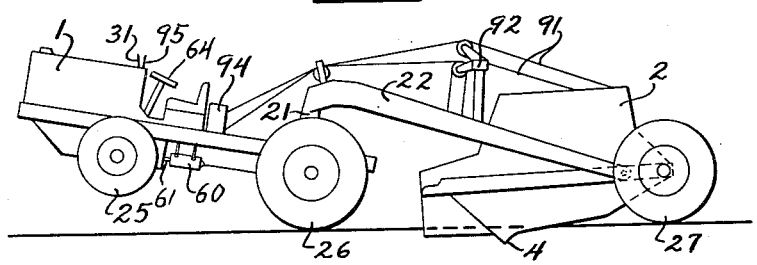
Fig. 2 is a schematic side view, showing the scraper of Fig. 1 in cutting position.

In Fig. 2 I have shown the same units with the front end of the propelling vehicle 1 raised from the ground so that the scraper combination is operated as a four-wheel unit in order to assure greater tractive effort. In this figure I have shown the scraper 2 dropped into cutting position, in which the cutting blade 4 is drawn through the ground to cut a layer from the surface and force it into the body of the scraper, to be carried away in the position shown in Fig. 1.

The main objects of my invention are accomplished by the construction linking the scraper to the prime-mover, which is illustrated in detail in Figs. 3 to 9, inclusive.

Frame rails 5 and 6 of the chassis are connected transversely, adjacent to the driving wheels, by front and rear cross members 7 and 8, centrally of which are formed massive journals 10 and 11 axially parallel to the center line of the chassis. Journals 10 and 11 receive a fixed shaft 12, on which is rockably mounted a Cardan cross member 15. The cross as a whole is free to rock about the center line of shaft 12.

Transverse shafts 16 and 17 are disposed in the Cardan cross member 15 normal to the longitudinal shaft 12 and carry pivotally a bifurcated yoke 19 which is rockable thereabout longitudinally of the chassis. The upper portion of yoke 19 has formed integrally therewith a king pivot 20, over which is fitted the bored engaging end 21 of the gooseneck beam 22 which constitutes the forward end of the scraper assembly 2. The points of connection between the cross 15 and the frame rails 5 and 6 are above and ahead of the point of attachment of rear axle beam 24 thereto, so that the tractive effort exerted along a line through the position in which the scraper edge engages the ground tends to promote stable relations between the scraper and the tractor.

By using the Cardan cross connection between the tractor and the scraper, I have made it possible for the scraper 2 to tilt universally relative to the tractor 1 and have so designed my structure that substantially greater freedom of relative movement is possible than in prior scraper connections. For example, the yoke 19 and king pivot 20 have a permissible swing to the rear, and to either side of the vertical, of approximately thirty degrees (30°) and a forward tilting of approximately forty degrees (40°), as shown in Fig. 4 at 23 and in Fig. 6 at 29. This enables my scraper combination to traverse easily rough terrain without difficulty.

As long as the scraper or trailer of different type is being hauled in the carrying position shown in Fig. 1, the weight of the tractor 1 and the scraper 2 is distributed between three sets of wheels, the tractor front wheels 25, the prime-mover rear wheels 26, and the scraper wheels 27. During such hauling the gooseneck beam 22 is freely rotatable about the king pivot 20, so that the vehicle, during such operation as a truck and trailer, can be easily maneuvered and will have a relatively short turning radius. The freely movable connection between the gooseneck beam 22 and the chassis through the cross 15 allows the scraper 2 to move about at will to adjust itself to road irregularities and to follow the tractor 1 wherever it is steered by the operator.

When the operator desires to begin making a cut if the trailer is of the scraper type, or when he desires to increase the tractive effort of the driven wheels regardless of the type of trailer, he raises the front wheels 25 of the tractor from the ground by energizing a hoisting cylinder 30 through a conveniently located control arm 31. Hoisting cylinder 30 has herein a plunger (not shown) fixed to a plunger rod 32 which operates through a hoisting cable 33 to raise the tractor. Hoisting cable 33 is anchored at 34 relative to the hoisting cylinder 30 and is guided by means of pulleys 35 and 36 around the end of plunger rod 32 to a swivelling pulley 37 attached to the top of the king pivot 20, and thence to an anchor 39 on the opposite side girder 6. When the hoisting cylinder 30 is energized, the arrangement of the hoisting cable 33 causes the forward end of the tractor to raise, so that the entire weight of the combined unit is now distributed between the tractor rear wheels 26 and the scraper wheels 27. This addition of weight to the tractor rear wheels 26 makes it possible to exert a substantially greater tractive effort than would be possible were the weight carried only partially on the rear wheels.

I limit the angle of hoist by means of hoisting latches 40, which are brought into engagement with latch pads 41, formed on the yoke 19, as shown in Fig. 7. As long as hydraulic pressure is maintained in the hoisting cylinder 30, the forward end of the vehicle will be constrained to its maximum angle of tilt relative to the yoke 19. I control the position of the hoisting latches 40 by means of a latching cylinder 42, pivotally mounted on the yoke 19 and acting through rods 44 pivotally connected to the hoisting latches 40. When the operator desires to release the yoke from the latch limiting the hoist, he releases the pressure in the hoisting cylinder 30. Conventional means, such as a spring, disposed within the cylinder 42, are provided which will act to throw the latches 40 out of engagement with the latch pads 41, as soon as pressure is released from the said hoisting cylinder through interconnected conduit 69. Connections are also provided and will be described in detail hereafter. They insure that the latches 40 will always be in place to limit the hoisting angle whenever the operator actuates the hoisting cylinder 30, so that it is not possible for the tractor to be hoisted beyond the desirable angle.

When the front wheels hoisted, all the steering is done by altering the position of the rear wheels 26 relative to the gooseneck beam 22. I position a steering plate 45 about the king pivot axis, illustrated herein as between the bored engaging end 21 of the gooseneck beam 22 and the bifurcated yoke 19. As illustrated, the steering plate is freely rotatable about the king pivot 20 during normal hauling or road travel. The steering plate is the connecting link between the tractor and the scraper when the tractor is in hoisted position. At one end of the steering plate 45 I form a locking notch 46, into which a locking pin 47 may project, when properly aligned, from a locking arm 49 rigidly attached to, and extending from, gooseneck 22. The gooseneck locking arm 49 carries a steering plate locking cylinder 50 which may be energized under the control of the operator to drive home the locking pin 47 which is housed in a suitable guide bore 51 at the outer end of gooseneck locking arm 49.

I provide a valve control mechanism, as will shortly appear, which does not permit cylinder 50 to eject the locking pin 47 into engagement with the locking notch 46 unless the two are properly aligned. When, however, the locking notch 46 and the locking pin 47 are in alignment, cylinder 50 operates to engage them. This makes the steering plate 45 operate as a fixed member relative to the gooseneck beam 22. I prefer to widen the locking end of steering plate 45 arcuately, as shown at 52, in order to provide additional strength at the locking notch 46, since this steering plate must resist all of the strains resulting from steering forces applied to the wheels 26.

At the opposite end of steering plate 45 a pivotal connection 54 joins the plate to a piston rod 55 controlled through a steering cylinder 56 by the operator. The steering cylinder 56 is mounted to one arm of the yoke 19 by a bracket 57, so that when hydraulic pressure is applied thereto, the yoke 19 is compelled to turn on its axis beneath the steering plate 45 and the gooseneck beam 22 fixed thereto. Thus, pressure in the steering cylinder 56, delivered through flexible conduits 100 and 101 from the servo mechanism hereinafter described, is translated into a steering movement of the rear tractor wheels 26 through the Cardan cross 15.

The action of steering cylinder 56 is, in turn, controlled by a servomotor, generally indicated at 60, connected through suitable linkage 61 to a conventional front wheel steering system, indicated generally at 62. It is to be borne in mind that as long as the front wheels 25 are in contact with the ground the operator steers the vehicle by direct control from the steering wheel 64 and the steering plate rotates in conformity with the movement of the steering wheel. When the front wheels have been hoisted, the operator uses the same steering wheel 64, and the relation between the turning of the steering wheel and the direction in which the vehicle turns is identical with the relation before tilting.

Figure 8:
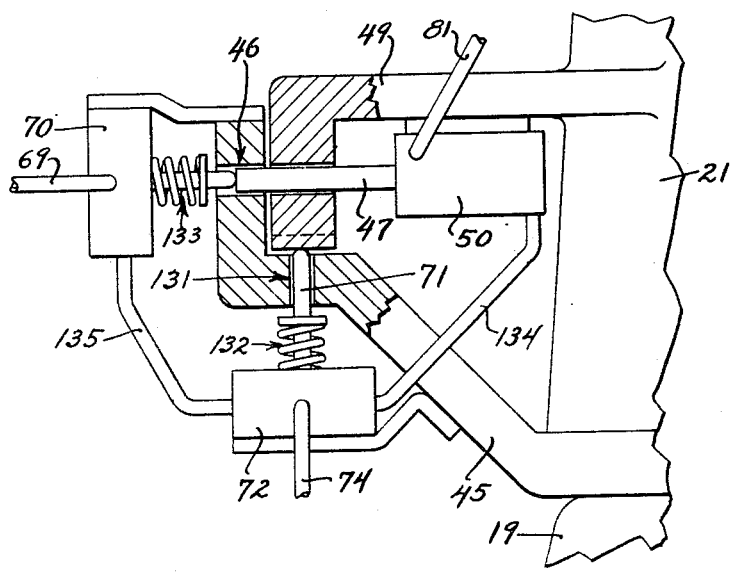
Fig. 8 is a vertical, sectional view through the locking pin in engaged position and control means for valve means associated therewith.
Figure 3:
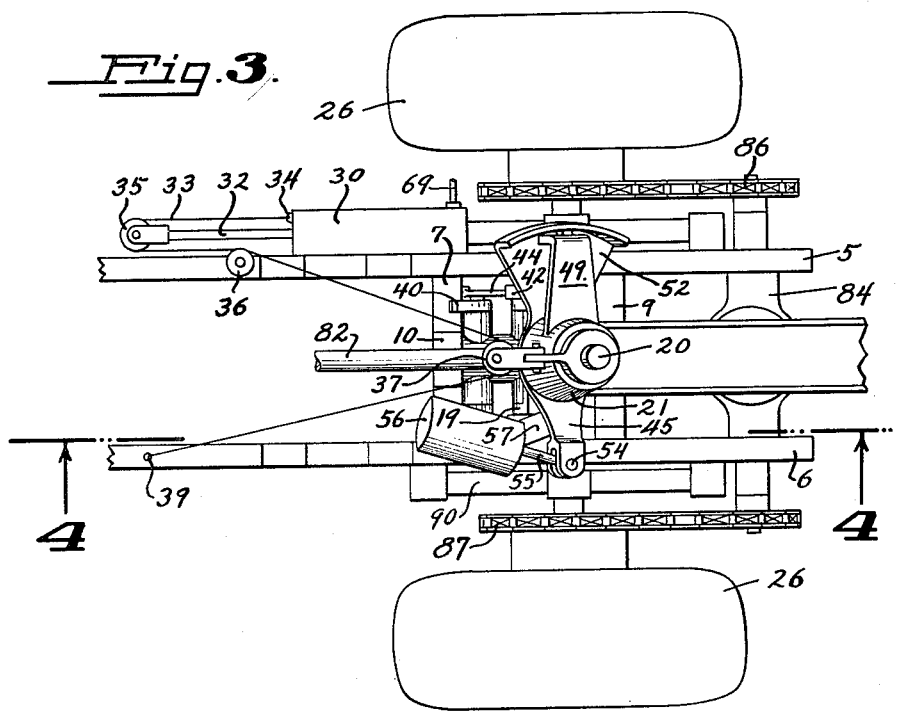
Fig. 3 is a top schematic view of the connecting structure between the tractor and the scraper.
Figure 6:
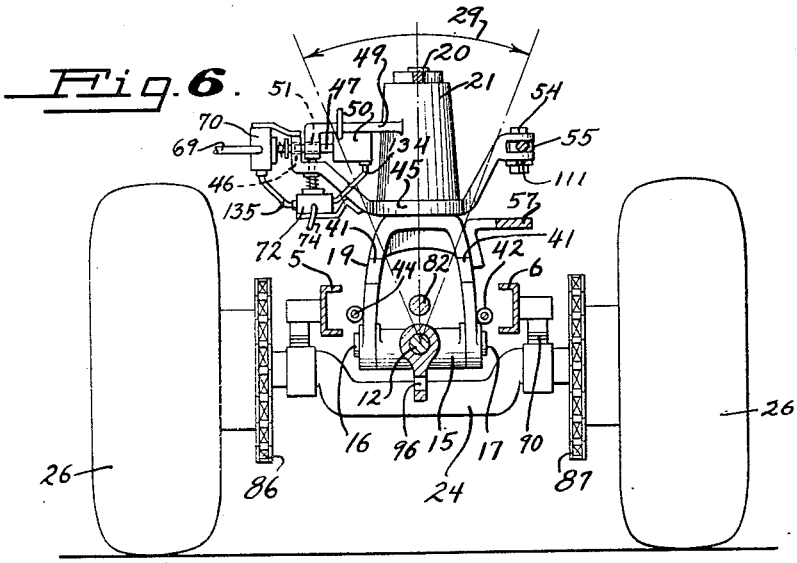
Fig. 6 is an end view, partially in section, taken along line 6—6 of Fig. 4.

The servomotor, designated generally at 60, is positioned longitudinally of the tractor frame and is of the conventional type, wherein a housing 105 is here illustrated in Fig. 8 as movable longitudinally relative to the frame of the tractor. For purposes of illustration, I have shown the housing pivotally attached to two arms 106 pivotally carried on the underside of the tractor frame. In practice, the housing could be slidably mounted on tracks carried by the frame.

The servomotor can be likened to a conventional D-valve, except that the housing is movable with relation to the valve block therein contained and to the frame. The housing contains a central valve block 107, slidable therein and adapted selectively to open and close ports 108 and 109 provided in said housing.

The steering system, indicated at 62, is connected to the front end of the valve block 107, through link 61. Movement of said steering system results in a corresponding longitudinal movement of the valve member 107 relative to the housing. Flexible conduit 100 communicates with port 108 and thence leads to one end of steering cylinder 56. Flexible conduit 101 leads from a port 190 to the opposite end of the said steering cylinder. A fluid-pressure line 75 leads from the reservoir 66, through the pump 67 to the servomotor through a port 110. Return conduits 77 are provided to return pressure medium to reservoir or sump 66 from the servomotor. A link wire 111 for tensional and compressional forces, slidably encased in a flexible casing, as a Bowden cable, is utilized to make connection between the housing and the steering plate 45 adjacent to the pivotal piston connection 54. The casing of the said wire is anchored, as at 112, to the frame of the tractor and to the steering cylinder, as at 113. It is obvious that the linkage can be modified in many ways between the housing and the steering plate. The servo mechanism shown in Fig. 9 is illustrated as in neutral position.

If the steering gear is rotated to the left, in order to turn the vehicle to the left, the steering system 62 imparts a corresponding longitudinal movement through link 61 to valve block 107 to move said block forwardly relative to the housing. Pressure medium will pass then through port 110 into port 108 and thence through communicating conduit 100 to the steering cylinder. At the same time hydraulic pressure has no access to port 109. Hence pressure medium within steering cylinder 56 is bled off through conduit 101, through port 109, and returns to the sump. Pressure exerted through conduit 100 to the steering cylinder causes the said piston head 55ª to move relative to the cylinder. If the steering plate is not locked to the gooseneck 22 the said steering plate will rotate about the king pivot freely in conformity with the steering movement of the front wheels as has been previously pointed out.

It should be borne in mind that the steering cylinder is rigidly attached to one arm of the yoke 19. Hence when the said steering plate is not locked to the gooseneck 22 it will rotate about the king pivot and will not impart rotative movement to the yoke. However, if the steering plate is locked to the gooseneck and the combination is in tilted position, the reactionary pressures exerted against piston head 55ª, which is connected to the locked steering plate through piston 55, will cause the cylinder to move relative to the piston, thereby transmitting said movement through bracket 57 and swivelling the wheels 26 through pressure exerted on the yoke 19.

In either case, whether the scraper combination is in horizontal hauling position or in inclined cutting position there is a relative horizontal angular movement between the steering plate 45 and the yoke 19 to which the steering cylinder 56 is attached. The same is true if another type of trailer be substituted for the scraper. Consequently, cable 111, rigidly attached to the steering plate and to the housing, exerts pressure on the said housing in conformity with the relative horizontal angular movement of the said steering cylinder and steering plate. Therefore, as pressure is admitted through port 108, because of the longitudinal movement of valve block 107 relative to the housing 105, there is a corresponding relative horizontal angular movement between steering plate 45 and steering cylinder 56. This movement is compensated by pressures exerted through cable 111 on the housing, so that as soon as the relative angular movement between the steering cylinder 56 and steering plate 55 is exactly proportionate to the longitudinal movement of valve block 107 the cable 111 will move the said valve to cut off further pressure through port 108.

It will be understood, then, that the cable 111, attached to plate 45 and to housing 105, cuts off further servo action when the said steering plate and steering cylinder have moved relative to one another through a horizontal distance proportionate to the movement of the steering system 62.

It will be observed that the servomotor functions in identical fashion, regardless of the position of the front wheels, but that its actions are not transmitted to the remainder of the system except when the gooseneck beam 22 is locked to the steering plate 45 and the tractor has been tilted upwardly to the normal cutting position. As has been noted, the steering plate 45 turns through an arc proportionate to the manipulation of steering wheel 64 while the front wheels of the tractor are on the ground. This is important as the steering locking notch 46 is always then in substantial alignment with gooseneck arm 49 while the combination is making a turn, as the gooseneck rotates freely on end pivot 20 and follows the tractor through the curve. Hence it is possible to align locking pin 47 and locking notch 46 even while in the midst of making a turn and thereby make it possible to tilt the tractor.

If it is desired to change from cutting to hauling position or from the position of greater tractive effort to that of less tractive effort while making a turn, it is extremely important that the tractor, upon being lowered to four-wheel position, starts out in a direction which corresponds to the angle of turn which was being followed by the tractive steering wheels 26 in tilted position. Otherwise, among other things, violent stress forces would be set up in the combination to the obvious injury of the mechanism. By my servo mechanism the horizontal angular position of the front steering wheels 25, for steering the combination in lowered or hauling position, is always the same as the horizontal angular position of steering wheels 26 which turn the combination when the tractor is in tilted or cutting position. Thus there is no violent shift of horizontal angular direction after transmission from four to six-wheel position, even though such transmission is effected in the midst of making a turn.

The valve box, illustrated in Fig. 9, provides for simple actuation of the various pressure mediums and return lines, as will hereinafter appear. Referring now to the drawings showing the inter-connected hydraulic conduits and the inter-related hydraulic valve means, the control arm 31 operates through conventional valves enclosed in the valve box 65 to transmit a hydraulic medium delivered from reservoir 66, under pressure, by a pump 67 to the operating components. The valve box 65 is located on the vehicle in convenient position to the operator's hands as he manipulates the steering wheel 64 and is arranged for simple movements to actuate the conventional valves therewithin.

In ordinary hauling position, the arm 31 is in what we shall designate as "down" position, wherein line 74 is closed by valve 74ª and return lines 81 and 80 are open through valves 81ª and 80ª, and the low pressure by-pass 120 is also open through valve 120ª. Hence pressure delivered through pump 67 follows the line of least resistance through low pressure valve 120ª. Therefore, the pressure through conduit 75, leading to servomotor 60, is correspondingly low. This is a precautionary measure as the hydraulic medium needed to operate the servo mechanism and revolve the steering plate need not be under high pressure to rotate the steering plate when the combination is in hauling position and the steering plate is not locked to the gooseneck.

When the operator desires to tilt the tractor into cutting or greater tractive position, higher pressure is needed to actuate the various parts of the system and, consequently, control arm 31 is moved from "down" position to "up" position, thereby opening valve 74ª in line 74 and closing lines 81, 80 and low pressure by-pass line 121. Pressure delivered through pump 67 is conducted into conduit 74 which, in turn, furnishes hydraulic pressure for the various hydraulic conduits, valves and cylinders in my mechanism. As soon as the pressure has been circulated throughout the system, pressure backs up and as it can not pass through the now closed low pressure by-pass it is, therefore, by-passed through high pressure by-pass, generally indicated at 122, which is open to return line 79. The high pressure by-pass is set for a predetermined pressure and, consequently, in this manner excessive pressure on the conduits and valves of my mechanism is relieved.

It will be seen that it is not desirable to hoist the tractor if it is substantially out of alignment with the scraper or other type of trailer, as in such case the locking pin 47 might be caused to engage the outside of the steering plate 45 instead of the locking notch 46. Hence, I connect control means intermediate the valve box 65 and the hoisting cylinder and latch conduit 69, which permits tilting of the tractor only when proper conditions prevail.

The initial step which must be taken prior to tilting the tractor is that of locking the steering plate 45 to gooseneck arm 49 by the insertion of pin 47, housed in arm 49, into locking notch 46 provided in the said steering plate. Valve 72 is positioned below the steering plate arm 52 and is rigidly affixed thereto by a bracket or other means. Valve 72 is provided with an upwardly extending positioning pin 71 projecting through a bore 131 provided in said steering plate. Bore 131 is aligned with the locking notch 46 and with the position of the locking pin 47 when the trailer or scraper gooseneck arm 49 and steering plate arm 52 are in alignment with one another. A spring 132 is provided in said valve to return the positioning pin 71 to projecting position after being depressed. Positioning pin 71 projects upwardly through the steering plate arm 52 a short distance so that when gooseneck arm 49 swings past the said pin projection it will depress the said pin and actuate valve 72, as will shortly appear.

A valve 70, similar to valve 72, is positioned adjacent to the arm 52 of steering plate 45 and is rigidly affixed thereto. A pin 133, provided with a spring return, projects into locking notch 46 so that when locking pin 47 is inserted into the locking notch it depresses the pin 133, thereby actuating valve 70.

When high pressure is conveyed through conduit 74 to valve 72, the locking notch 46 and locking pin 47 must be aligned with one another before the pin will be forced into the said locking notch. This operation is performed by arm 49 depressing positioning pin 71 which actuates valve 72 to release pressure through lines 134 to locking cylinder 50 and, through line 135, to latch valve 70. The cylinder 50 thereby actuated by pressure through conduit 134 forces locking pin 47 into locking notch 46, locking the gooseneck to the steering plate and at the same time depressing pin 133 of latch valve 70 and resultantly releasing pressure from said latch valve 70 into conduit 69. Pressure in conduit 69 causes latch cylinder 42 to raise hoisting latches 40 to their proper positions to contact latch pads 41 and prevent the tractor from tilting beyond a maximum limit, as has been previously pointed out. As latching cylinder 42 is positioned on conduit 69, intermediate latch valve 70 and hoisting cylinder 30 and because it takes a greater amount of pressure to raise the tractor than it does to raise the relatively small latches 40, it is obvious that the latching cylinder will be completely operated before the hoisting cylinder operates to tilt the tractor.

I have provided a return line 79 from the valve box 65. Return line 80 feeds back from the hoisting cylinder and latch conduit 69 through the valve box 65 to the reservoir 66 as does a lock cylinder return line 81. As has been previously pointed out, the valve box control arm 31 is adapted to cut off the return lines when the high pressure medium is conducted to the various components of the system. Upon shifting the control arm, high pressure is cut off and the return lines are opened. As has been noted, spring means are provided within each of the hydraulic cylinders and valves in order that the linkages associated therewith may return to original position immediately upon the cessation of delivery thereto of hydraulic pressure.

In the drawings, I have illustrated my tractor as propelling the tractor and trailer combination through a drive shaft 82, operating through a jackshaft housing 84 and dual driving axles 85 located at the extreme rear of the chassis. Axles 85 have fixed thereon sprockets 86, over which chains 87 extend to individual wheel sprockets 89. The individual wheels 26 are carried by the axle beam 24, which is centrally depressed below the rotational axis of the wheels and is connected by springs 90 to the chassis outside the frame rails 5 and 6. This position of the jackshaft housing at the extreme rear of the chassis allows space for the pivoting movement of the Cardan cross 15. The transverse front and rear cross members 7 and 9 are also centrally depressed, as shown in Fig. 4, and the steering plate is bent upwardly on both sides of the yoke 19 to contribute to the freedom of motion. I connect the drive shaft 82 centrally of the bifurcated yoke 19 for the same reason.

Separate control cables 91 are carried by a conventional pulley system, indicated generally at 92, to winches 94 on the tractor. Winches 94 are controlled by suitable levers 95, mounted conveniently in front of the operator adjacent to the valve control arm 31, to determine the position of the scraper 2 and the depth of the cut made by the scraper blade 4. These levers might be positioned on the dashboard or adjacent to the usual gear shift levers on the floor of the truck cab.

I have also provided an eyebolt 96 formed integrally and projecting beneath the Cardan cross member 15 for connection to the vehicle of a tow bar (not shown) in case it is desired either to give or to receive additional tractive effort.

In the claims, when referring to the servomotor and linkage connecting the said servo motor to the conventional steering system 62 and to the steering plate and associated components, I shall sometimes, for simplicity, use the phrase "steering relay mechanism," that is, relay of the movement of steering system 62 to the steering plate when said steering plate is not locked to the scraper, or relay of the steering system movement to the wheels 26 which are caused to swivel when the steering plate is locked to the scraper.

In summary, sequential operation of various parts of the combination is as follows: During normal six-wheel or hauling operation, the hydraulic pump 67 is by-passing pressure medium through a low pressure by-pass valve 120 and the servomotor 60 is supplied at this time with a low pressure oil or other pressure medium which keeps the steering plate 45 rotating in conformity with the swiveling of the front steering wheels, but said steering plate having no separate steering function in and of itself.

When tilting action is desired, control arm 31 is appropriately moved to work the gang of valves in valve box 65 which closes the low pressure by-pass valve and admits high pressure oil through line 74. When gooseneck arm 49 is aligned with locking notch 46, positioning pin 71 is depressed. This actuates valve 72 which releases the pressure medium to actuate lock cylinder 50, causing locking pin 47 to be inserted into locking notch 46. This locks the steering plate 45 and gooseneck 22 to one another. The complete movement of locking pin 47 into locking notch 46 actuates latch valve 70 which is in communication with the high pressure medium delivered to valve 72. When latch valve 70 is actuated, it releases high pressure medium to line 69 which, in turn, conducts the said high pressure medium to latch cylinder 42 and hoisting cylinder 30.

As has been pointed out previously, latch 40 will be brought into position prior to operation of hoisting cylinder 30 which tilts the tractor chassis. The chassis is then elevated by the hoisting cylinder 30. Latch 40 contacts latch pad 41 and restrains the chassis to a maximum angle of tilt. Continuous oil pressure on hoisting cylinder 30 retains the elevated position. High pressure oil through pump 67 is now operating through high pressure relief by-pass 122 to prevent excessive pressure in the lines. The high pressure medium is at this time conducted to the servomotor 60 which is actuated through linkage 61 through the steering gear 62. High pressure medium is admitted through the servo mechanism to one side or the other of steering cylinder 56. Because of the said servo mechanism and linkage previously described, the steering of the tilted combination is controlled.

When it is desired to release the tractor from its tilted position and resume normal six-wheel operation, the control arm 31 is appropriately moved to open the low pressure by-pass valve 120 and open the bleeder valves 81ᵃ and 80ᵃ on return lines 81 and 80. The pressure is thereby released from the hoisting cylinder 30, latch cylinder 42, and lock cylinder 50. Because hoisting cylinder 30 has more retrieving force on it than either the latch cylinder 42 or the lock cylinder 50 it will return to normal position first, thereby lowering the front wheels of the tractor to the ground. As soon as the front wheels touch the ground, the retrieving force is lifted from the hoisting cylinder 30 and lock cylinder 50 and latch cylinder 42 immediately release and return to normal through spring returns.

From the above description it will be apparent to those skilled in the art that I have invented means for connecting a trailer to a tractor in such fashion that the vehicle is suited for high speed operation and is equally adapted to high tractive effort operation when the trailer is a scraper in cutting. The unit may run at high speed when carrying earth and at high tractive effort. The form of connection which has been developed between the tractor and the scraper transmits the tractive effort to the cutting blade in such a manner that the system is stable even when traversing irregular ground, and there is no tendency for the scraper blade to weave from side to side or to oscillate vertically. By using a universal connection properly placed in relation to the point in which driving forces are applied to the traction wheels, I have made it possible to steer the vehicle easily and simply. My system of controls enables a relatively unskilled operator to keep the vehicle in hand at all times and responsive to his wishes.

The terms "tractor" and "trailer" are used in this description and the appended claims to indicate the device which causes the moving and the device which is moved thereby, respectively, regardless of whether the tractor pulls or pushes the trailer.

The principle of the invention remains the same regardless of the operative number of wheels included on the tractor or trailer. It is intended that the claims cover the principle regardless of variations in the number of wheels on either the tractor or the trailer.

While the invention has been illustrated and described in certain detail of embodiment for illustrative purposes, it is not intended that the invention be limited thereto but that modifications and changes in details of construction and arrangement of parts may be incorporated within the spirit and scope of the appended claims.

I claim:

1. An ear moving vehicle adapted to operate as a six-wheel unit during hauling and as a front wheel drive four-wheel unit during cutting, comprising a tractor and a trailer, said trailer connected to said tractor by a universal pivot means comprising a member carried by said prime-mover, a steering plate carried by said member, means to lock said trailer to said steering plate, means to tilt vertically said tractor relative to said trailer, and means to actuate sequentially said locking and said tilting means.

2. An earth handling vehicle comprising a tractor and a trailer, pivot members carried by said tractor and trailer for pivotal connection between them, locking means carried by one of said pivot members to lock said trailer to said tractor in steering-adjusted relation, hydraulic means to tilt vertically said tractor relative to said trailer, and means to operate sequentially said locking and said tilting means.

3. In an earth moving vehicle adapted to operate as a six-wheel unit or as a front wheel drive four-wheel unit, comprising a tractor and a trailer, a member pivotally carried by said tractor and removably pivotally connected to said trailer, a steering plate rotatably mounted on said member, means to lock said steering plate to said trailer, means to tilt said tractor vertically with respect to said trailer, means to limit the vertical tilt of said tractor relative to said trailer, and means to actuate sequentially said locking, limiting and tilting means.

4. In an earth moving vehicle adapted to operate as a six-wheel unit or as a front wheel drive four-wheel unit, comprising a tractor and a trailer pivotally connected to one another by means of a universal pivot means comprising a member carried by said tractor, and means for automatic sequential locking of said tractor to said trailer in steering-adjusted relation and tilting vertically said tractor with respect to said trailer.

5. In an earth moving vehicle, comprising a tractor and a trailer, a universal joint carried by said tractor adapted to be pivotally connected to said trailer, a steering plate mounted on said universal joint and revoluble with respect to said universal joint and said trailer, conventional steering means carried by said tractor, a steering relay mechanism attached to said steering means and to said steering plate to rotate said steering plate in conformity with the movement of said conventional steering means, and means to lock said steering plate to said trailer.

6. An earth handling vehicle, comprising a tractor and a trailer, a pivot means comprising a member carried by said prime-mover for pivotal connection to said trailer, a steering plate mounted on said pivot member and revoluble with respect thereto and to said trailer, means to lock said steering plate to said trailer, means to tilt vertically said tractor with respect to said trailer, conventional steering means to steer said tractor in normal untilted position, a steering relay mechanism attached to said steering means and to said steering plate to cause relative rotation of said steering plate and pivot member with respect to one another in conformity with the movement of said steering means, and means to actuate sequentially said locking and tilting means.

7. An earth handling vehicle comprising a tractor and a trailer, a pivot means comprising a member carried by said prime-mover for pivotal connection to said trailer, a steering plate mounted on said pivot member and revoluble with respect thereto and to said trailer, means to lock said steering plate to said trailer, means to limit the vertical tilting of said tractor, means to tilt vertically said tractor relative to said trailer, means to actuate sequentially said locking, limiting and tilting means and continuously maintain said means in operation, conventional steering means to steer said tractor in normal untilted position, and a steering relay mechanism attached to said steering means and to said steering plate to cause relative rotation of said steering plate and said pivot member with respect to one another in conformity with the movement of said steering means.

8. An earth moving vehicle adapted to operate as a six-wheel unit or as a front wheel drive four-wheel unit, comprising a tractor and a trailer, a pivot member carried by said tractor for pivotal connection to said trailer, a steering plate mounted on said member revoluble relative to said member and said trailer while said vehicle is in hauling position, means to lock said steering plate to said trailer, conventional steering means provided in said tractor, a steering relay mechanism attached to said steering means and said steering plate to cause relative rotation of said steering plate and pivot member with respect to one another when said steering plate is locked to said trailer and said vehicle is a four-wheel unit in conformity to the movement of said conventional steering means.

9. A self-loading, automotive, earth-handling vehicle, comprising a tractor, a trailer, a pivot means comprising a member carried by said tractor and connected to said trailer and allowing universal movement between said tractor and trailer during hauling, a steering plate mounted on said pivot member, means to lock said steering plate to said trailer, means to tilt vertically said tractor relative to said trailer, means to limit the angle of vertical tilt of said tractor, valve means to actuate sequentially said locking, limiting and tilting means and continuously maintain said means in operating position and to release automatically sequentially said tilting, limiting and locking means and return said means to normal position.

10. A device for handling earth, comprising a tractor having front wheels arranged for steering and rear wheels arranged to exert tractive effort, a self-loading scraper universally connected to said tractor for hauling, means for tilting vertically said tractor relative to said scraper so that substantially the entire weight of said tractor is on said rear wheels during self-loading of said scraper, and steering means for controlling the horizontal, angular relation between said tractor and said scraper after said transfer of weight.

11. A connection for a tractive unit and a trailer, comprising a universal joint having two normally disposed pivotal axes, a connection about one of said pivotal axes to the chassis of said tractive unit, a bifurcated yoke connected about the other of said pivotal axes, a king pivot formed on said yoke, a steering plate rotatably journaled about said king pivot, a gooseneck beam extending from said trailer, a bore formed in said gooseneck beam and journaled about said king pivot, means for locking said beam relative to said steering plate, and means for producing relative rotation between said steering plate and said king pivot.

12. A connection for a tractive unit and a trailer, comprising a universal joint having two normally disposed pivotal axes, a first connection between one of said pivotal axes and said tractive unit, a second connection between the other of said pivotal axes and said trailer rockable about said other axis, a steering plate freely rotatable about said second connection, means for fixing the angular relation of said trailer to said steering plate, and means for varying the angular position of said steering plate about said second connection.

13. A connection for a tractive unit and a trailer, comprising a universal joint having two normally disposed pivotal axes, a connection about one of said pivotal axes to the chassis of said tractive unit, a bifurcated yoke connected about the other of said pivotal axes, a king pivot formed on said yoke, a steering plate rotatably journaled about said king pivot, a gooseneck beam extending from said trailer, a bore formed in said gooseneck beam and journaled about said king pivot, means for locking said beam relative to said steering plate, a hydraulic cylinder fixed to said yoke, a piston in said cylinder, a pivotal connection between said piston and said steering plate, and means for selectively energizing said cylinder.

14. In a tractive unit and trailer connected substantially as described in claim 13, means for sequentially permitting operation of said means for locking the steering plate relative to the gooseneck only in properly aligned position of said plate and gooseneck, tilting said tractive unit through a limited angle relative to said trailer only after locking of said steering plate relative to said gooseneck, and a steering relay mechanism operable in conjunction with the normal steering apparatus of said tractive unit and comprising the hydraulic cylinder to be effective as a steering means in tilted position of the said tractive unit.

15. An automotive device, comprising a trailer, a tractor therefore, and means comprising a swivel connection to connect said trailer to said tractor, said trailer having wheel means to support it for movement by said tractor, said tractor having wheel means to steer it, a steering device to actuate said wheel means, and driven wheel means to propel said tractor, said automotive device having means to tilt said tractor about the axis of said driven wheel means and maintain it so during operation to increase the weight carried thereby and the traction effect thereof, and means to cause said driven wheel means to swivel as steering wheels about said swivel connection on actuation of said steering device when said tractor is in tilted position.

16. A self-loading, earth-hauling device, comprising a tractor vehicle having driven wheels, steering wheels, and steering mechanism to control said steering wheels; a self-loading trailer vehicle having free wheels, an adjustable scoop-like scraper to pick up material when in lowered position and transport it when in raised position; and means for joining said tractor and trailer vehicles in universally pivoted relation, whereby said automotive device may operate as a six-wheel-type vehicle; means to raise the front wheels of said tractor, a member pivoted loosely with respect to said trailer, means to fix the position of said member with respect to said trailer, and a steering relay mechanism connected to said member and to said steering mechanism to cause relative pivoting of said tractor to said member when the front wheels of said tractor are raised.

17. A self-loading, earth-hauling device, comprising a tractor vehicle having driven wheels, steering wheels, and steering mechanism to control said steering wheels; a self-loading trailer vehicle having free wheels, an adjustable scoop-like scraper to pick up material when in lowered position and transport it when in raised position; means for joining said tractor and trailer vehicles in universally pivoted relation, whereby said device may operate as a six-wheel-type vehicle; means to raise the front wheels of said tractor, a steering plate pivoted loosely with respect to said trailer, means to lock said steering plate to said trailer; means connected to said steering plate to cause relative pivoting of said tractor to said steering plate when the front wheels of said tractor are raised; and means to connect said last mentioned means with said steering mechanism.

18. A vehicle comprising a tractor having four wheels, including driven wheels, a trailer having two wheels, a universal pivot connection between said tractor and trailer, whereby said vehicle is adapted to be a six-wheel unit; and means to convert said six-wheel unit into a front-drive, four-wheel unit comprising means to tilt said tractor and maintain it tilted during operation, and means to connect said driven wheels to said trailer as steering wheels.

19. A vehicle comprising a tractor frame having a pair of driven wheels, a trailer frame, means to cause relative tilting of said frames about the axis of said driven wheels to increase the load on, and the traction of, said driven wheels, and means to connect steerably said tractor and trailer when in relatively tilted position.

20. A vehicle comprising a tractor frame having a prime mover and a pair of driven wheels, a trailer frame having a pair of wheels, said frames having their centers of gravity at different sides of the axis of said driven wheels, means to cause relative tilting of said frames about said axis to increase the load on, and the traction of, said driven wheels, and means to connect steerably said tractor and trailer when in relatively tilted position.

21. A vehicle comprising a tractor frame having a prime mover and a pair of driven wheels, a trailer frame having a pair of wheels, one of said frames having another wheel having its axis out of line with the axes of said previously mentioned wheels, means to cause relative tilting of said frames about the axis of said driven wheels to increase the load on, and the traction of, said driven wheels, and means to connect steerably said tractor and trailer when in relatively tilted position.

22. A vehicle comprising a tractor frame having a pair of driven wheels, a trailer frame having a pair of wheels, at least one of said frames having another pair of wheels whereby the vehicle is adapted to operate as a six-wheel unit, means to cause relative tilting of said frames about the axis of said driven wheels to increase the load on, and the traction of, said driven wheels and to convert reversibly said vehicle into a unit wherein the said driven wheels are the front wheels of said vehicle, and means to connect steerably said tractor and trailer when in relatively tilted position.

23. A vehicle comprising a tractor frame having a pair of driven wheels, a trailer frame having a pair of wheels, said tractor frame having another pair of wheels whereby the vehicle is adapted to operate as a six-wheel vehicle, means to cause relative tilting of said frames about the axis of said driven wheels to increase the load on, and the traction of, said driven wheels and to convert reversibly said vehicle into a unit wherein the said driven wheels are the front wheels of said vehicle, and means to connect steerably said tractor and trailer when so connected.

24. A vehicle comprising a tractor frame having a pair of driven wheels, a trailer frame having a pair of wheels, said tractor frame having another pair of wheels whereby the vehicle is adapted to operate as a six-wheel vehicle, said pair of driven wheels being between said other pairs of wheels, and means to cause relative tilting of said frames about the axis of said driven wheels to increase the load on, and the traction of, said driven wheels and to convert reversibly said vehicle into a unit wherein the said driven wheels are the front wheels of said vehicle, and means to connect steerably said tractor and trailer when so connected.

25. A vehicle comprising a tractor frame having a pair of driven wheels and another pair of wheels, a trailer frame having a pair of wheels, said driven wheels being between said other pairs of wheels, means to transfer reversibly load from said trailer frame wheels onto said driven wheels comprising means to cause relative tilting of said frames about the axis of said driven wheels, and means to connect steerably said tractor and trailer when in relatively tilted position.

26. A connection for a tractor and trailer, comprising a universal joint having two normally disposed pivotal axes, a connection about one of said pivotal axes to the chassis of said tractor, a bifurcated yoke connected about the other of said pivotal axes, a king pivot formed on said yoke, a steering plate rotatably journaled about said king pivot, a gooseneck beam extending from said trailer, a bore formed in said gooseneck beam and journaled about said king pivot, means for locking said beam relative to said steering plate, a member fixed to said yoke, a member pivotally connected to said steering plate, and means for selectively causing relative movement between said members.

27. In a tractor and trailer connected substantially as set forth in claim 26, means for sequentially permitting operation of said means for locking the steering plate relative to the gooseneck only in properly aligned position of said plate and gooseneck and tilting said tractor through a limited angle relative to said trailer only after locking of said steering plate relative to said gooseneck, and a steering relay mechanism operable in conjunction with the normal steering apparatus of said tractor and comprising the means for causing relative movement between the members to be effective as a steering means in tilted position of said tractor.

28. A self-loading and transporting automotive device comprising a tractor, a self-loading carrier, a universal joint-like connection between said carrier and said tractor; said carrier having wheel means to support it for movement by said tractor; and an adjustable scoop-like scraper to pick up material when in lowered position and transport it when in raised position, said tractor having steering wheel means, steering means to operate said steering wheel means, and driven wheel means to propel said tractor; means comprising a connection between said tractor and said carrier to raise said steering wheels from the ground and maintain them so during scraping, and means to cause said driven wheel means to swivel as steering wheels with said universal joint-like connection as a pivot therefor on actuation of said steering means when said steering wheel means are in raised position.

ANDREW K. BRUMBAUGH.